US009958045B2

(12) United States Patent
Meixner

(10) Patent No.: US 9,958,045 B2
(45) Date of Patent: May 1, 2018

(54) DRIVE DEVICE FOR FOUR-WHEEL-DRIVE MOTOR VEHICLES

(71) Applicant: AUDI AG, Ingolstadt (DE)

(72) Inventor: Christian Meixner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 52 days.

(21) Appl. No.: 14/896,241

(22) PCT Filed: Jun. 3, 2014

(86) PCT No.: PCT/EP2014/001494
§ 371 (c)(1),
(2) Date: Dec. 4, 2015

(87) PCT Pub. No.: WO2014/195010
PCT Pub. Date: Dec. 11, 2014

(65) Prior Publication Data
US 2016/0138691 A1    May 19, 2016

(30) Foreign Application Priority Data

Jun. 7, 2013  (DE) .......................... 10 2013 009 542

(51) Int. Cl.
*B60K 17/342* (2006.01)
*B60K 17/348* (2006.01)
*F16H 37/08* (2006.01)

(52) U.S. Cl.
CPC ......... *F16H 37/082* (2013.01); *B60K 17/342* (2013.01); *B60K 17/348* (2013.01)

(58) Field of Classification Search
CPC .... F16H 37/082; B60K 17/342; B60K 17/348
See application file for complete search history.

(56) References Cited

U.S. PATENT DOCUMENTS 1,386,510 A * 8/1921 Kraft ..................... B60K 17/16
                                                      475/229
2,659,246 A   11/1953 Norelius
                (Continued)

FOREIGN PATENT DOCUMENTS

CN      101638094       2/2010
CN      201613818 U    10/2010
                (Continued)

OTHER PUBLICATIONS

International Search Report issued by the European Patent Office in International Application PCT/EP2014/001494.
(Continued)

*Primary Examiner* — Tisha D Lewis
(74) *Attorney, Agent, or Firm* — Henry M. Feireisen LLC

(57) ABSTRACT

A drive device for four-wheel-drive motor vehicles includes a primary axle which is driven by a drive assembly via a center differential and a secondary axle which is driven via the primary axle and via a transmission. Side differentials are arranged on the output elements of the primary axle coaxially to the center differential of the primary axle. The drive elements of the side differentials have a drive connection to the output elements of the center differential, and the output elements of the side differentials have a drive connection to the driveshafts of the primary axle and to the driveshafts of the secondary axle via multiple belt drives.

4 Claims, 3 Drawing Sheets

(56) References Cited

U.S. PATENT DOCUMENTS

| | | | |
|---|---|---|---|
| 2,754,691 A | | 7/1956 | May |
| 2,802,539 A | | 8/1957 | Westfall |
| 3,709,315 A | | 1/1973 | Fisher |
| 4,063,609 A | | 12/1977 | Kincaid |
| 5,064,017 A | * | 11/1991 | Kikuchi ................ B60K 17/08 180/248 |
| 5,143,167 A | * | 9/1992 | Moriyama ............... B60K 5/04 180/248 |
| 5,685,389 A | * | 11/1997 | Muller ............... B60K 17/3462 180/233 |
| 6,523,633 B1 | * | 2/2003 | Teraoka ................ B60K 17/04 180/248 |
| 8,007,391 B2 | * | 8/2011 | Kikura .................. B60K 17/16 475/221 |
| 8,241,163 B2 | * | 8/2012 | Yamamura ......... B60W 30/045 475/199 |
| 8,727,927 B2 | | 5/2014 | Meixner |
| 2002/0108799 A1 | | 8/2002 | Price |

FOREIGN PATENT DOCUMENTS

| | | |
|---|---|---|
| CN | 102189927 A | 9/2011 |
| CN | 202357866 U | 8/2012 |
| DE | 84 20 313 | 10/1984 |
| DE | 202004016571 | 1/2005 |
| DE | 20 2006003152 | 2/2007 |
| DE | 20 2011002786 | 7/2011 |
| FR | 961 585 | 5/1950 |
| FR | 1367891 | 7/1964 |
| GB | 295820 | 8/1928 |
| GB | 878075 | 9/1961 |
| GB | 1161820 | 8/1969 |
| JP | 2005 035379 | 2/2005 |
| WO | WO 81/03150 | 11/1981 |
| WO | WO 08103150 | 11/1981 |
| WO | WO 93/05974 | 4/1993 |
| WO | WO 94/14628 | 7/1994 |
| WO | WO 9414628 | 7/1994 |
| WO | WO 01/21430 | 3/2001 |
| WO | WO 0121430 | 3/2001 |

OTHER PUBLICATIONS

Chinese Search Report issued by the Chinese Patent Office dated Apr. 1, 2017 in counterpart Chinese patent application No. 201480032076.0.

English translation of Chinese Search Report issued by the Chinese Patent Office dated Apr. 1, 2017 in counterpart Chinese patent application No. 201480032076.0.

* cited by examiner

DRIVE DEVICE FOR FOUR-WHEEL-DRIVE MOTOR VEHICLES

CROSS-REFERENCES TO RELATED APPLICATIONS

This application is the U.S. National Stage of International Application No. PCT/EP2014/001494, filed Jun. 3, 2014, which designated the United States and has been published as International Publication No. WO 2014/195010 and which claims the priority of German Patent Application, Serial No. 10 2013 009 542.5, filed Jun. 7, 2013, pursuant to 35 U.S.C. 119(a)-(d).

BACKGROUND OF THE INVENTION

The present invention relates to a drive device for four-wheel drive motor vehicles.

Four-wheel-drives for motor vehicles, in particular passenger cars, can be roughly divided into permanent drives with two axle differentials and an intermediate axle differential (for avoiding drive tensions) and so-called hang-on drives with a primary axle that is directly driven by the drive aggregate and a secondary axle that can be activated via a clutch (for example a viscous clutch or a Haldex clutch) in the case of drive slip. The primary axle or secondary axle can hereby be the front axle or the rear axle of the motor vehicle.

JP 2005 035 379 A1 discloses a drive device in which the secondary axle of the motor vehicle is driven via a toothed belt drive as transmission means form the primary axle to the secondary axle. The differentials of the two axles are arranged in a conventional manner coaxial to the drive shafts that output to the wheels. Further a controllable clutch is provided via which the force flux to the secondary axle can be interrupted for achieving for example only a front drive of the motor vehicle.

From WO 81/03150 a generic drive device is known in which a secondary axle is impinged, via two lateral belt drives, by the primary axle of the motor vehicle or drive shafts of the primary axle that output on the wheels. A differential is only provided on the primary axle, which odes not allow satisfactorily compensating differences in rational speed of the wheels in particular driving through curves.

SUMMARY OF THE INVENTION

It is an object of the invention to set forth a drive device of the generic type which has a particularly compact design and which offers greater constrictive freedom regarding its arraignment in a motor vehicle.

The object is solved with the features of the independent patent claim. Advantageous refinements and embodiments of the invention are set forth in the dependent claims.

According to the invention it is proposed that side differentials are arranged coaxial relative to a center differential of the primary axle at the output elements of the center differential, with the input elements of the side differentials being drivingly connected with the output elements of the center differential and the output elements of the side differential being drivingly connected with the drive shafts of the primary axle and, via multiple, in particular two, separate belt drives with the drive shafts of the secondary axle. A significant advantage is hereby that the center differential and the two side differentials can be mounted in a compact arrangement and constructively advantageously with a common axis of rotation and can optionally be arranged axially directly adjacent each other and can be supplied with lube oil via a common lubricant source. Without integrated differential, the configuration of the secondary axle can be greatly simplified. In addition a torque distribution to the wheels of the motor vehicle predetermined by the transmission layout of the side differentials is ensured while reliably compensating rotational speed differences.

Particularly preferably the center differential can be configured as bevel-gear differential of simple design and the side differentials can be configured as planetary transmissions with a short extent in axial direction. Optionally however all three differentials can be formed by planetary transmissions.

An easy-to-manufacture construction having good efficiencies can be achieved in that the input elements of the side differentials are the arms of the planetary transmission that carry the planet gears, and the output elements are the sun gears and the ring gears.

The belt drives can for example be chain transmissions. Preferably however toothed-belt drives are proposed, which in the case of greater transmission distances can be configured multi-part with intermediate wheels, deflection wheels etc. in the transmission housings for stabilization and adjustment to given mounting conditions.

Further, when the drive aggregate is transversely mounted in the motor vehicle, the center differential of the primary axle can be integrated into the drive aggregate while the coaxial side differentials can be mounted to the drive aggregate. The drive aggregate can hereby be arranged at the front or the rear of the motor vehicle, wherein the secondary axle, which is driven via the toothed-belt drive, in this case either forms the rear axle or the steered front axle.

On the other hand when the drive aggregate is mounted longitudinally in the motor vehicle (at the front, the rear or centered), the center differential of the primary axle and the two side differentials can be arranged inside a common axle housing, which is drivingly connected with the drive aggregate, wherein the center differential coaxially outputs to the drive shafts of the wheels and the side differentials on both sides of the drive aggregate output to the drive shafts of the secondary axle via belt drives. This results in a compact arrangement of the three differentials in the axle housing of the primary axle and also provides greater freedom regarding the arrangement of the drive aggregate, for example also with regard to the axle weight distribution of the motor vehicle. Hereby the drive aggregate can drive the bevel-gear center differential of the primary axle via an axle-parallel, integrated or external output shaft and a bevel gear drive.

Finally in a further embodiment of the drive device, the center differential can be attached to the aggregate housing on a side of the variable speed transmission, when the drive aggregate is mounted longitudinally in the motor vehicle, wherein the half shaft of the center differential crosses the transmission input shaft and wherein the side differentials are positioned on both sides of the drive aggregate and output to the secondary axle via the belt drives.

The invention also provides for a method for operating a drive device with one or more of the feature(s) described above and/or set forth in the apparatus claims, resulting in the same advantages as described above.

BRIEF DESCRIPTION OF THE DRAWING

In the following three exemplary embodiments of the invention are explained in more detail by way of the included schematic drawing.

It is shown in.

DETAILED DESCRIPTION OF PREFERRED EMBODIMENTS

Figure 1:
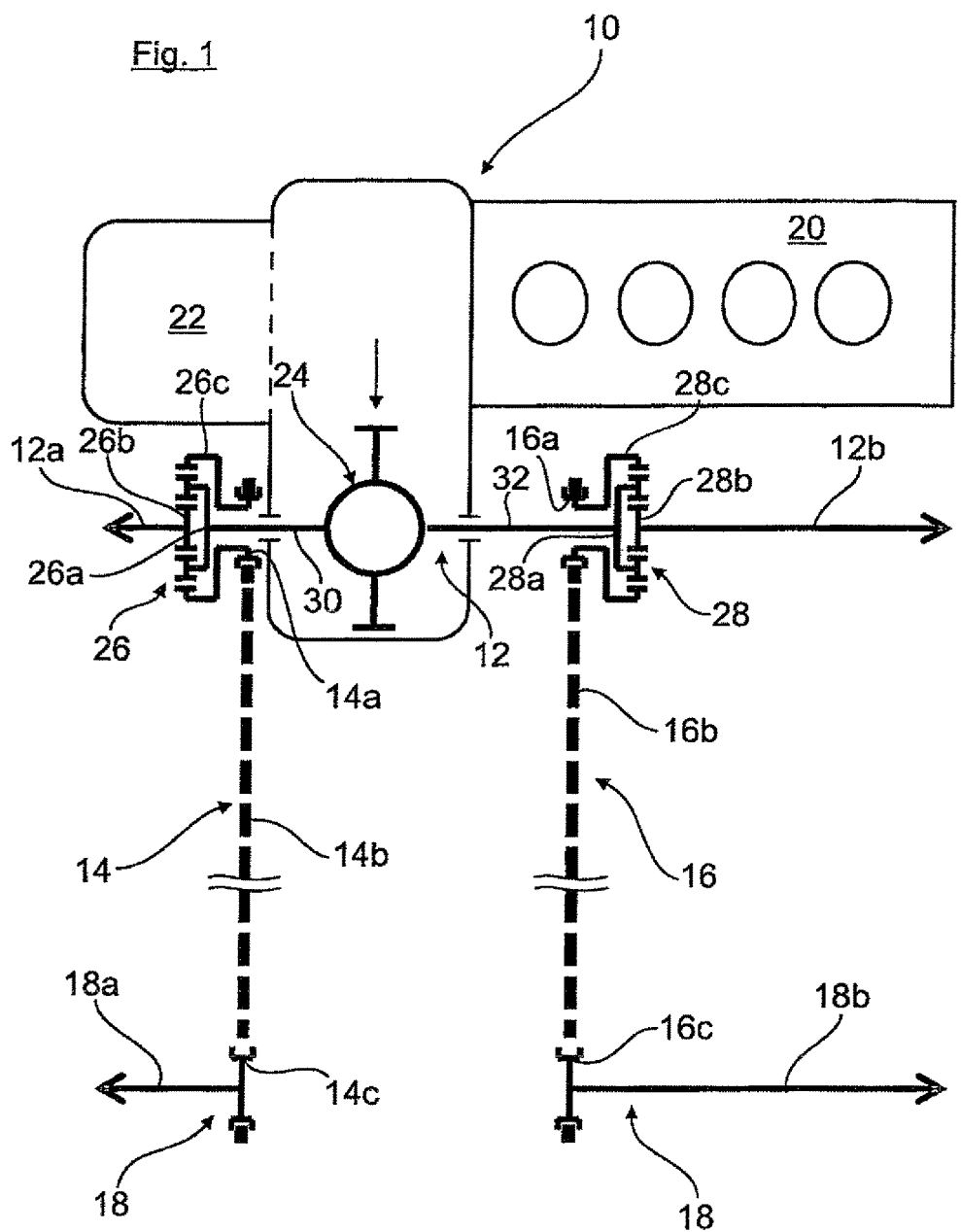
FIG. 1 a schematic diagram of a drive device for all-wheel-drive motor vehicles with a transversely mounted drive aggregate, a primary axle having three coaxial differentials and a secondary axle driven via toothed-belt drives.

FIG. 1 shows a very schematic representation of a drive device for an all-wheel-drive motor vehicle with a drive aggregate 10 mounted transversely in the front, which drives a front axle or primary axle 12, and via the primary axle a rear axle or secondary axle 18 of the motor vehicle via transmission means or two toothed-belt drives 14, 16.

The drive aggregate 10 is formed essentially by an internal combustion engine 20 (this may also be a different drive machine, for example an electric machine), a variable speed transmission 22 and an integrated bevel-gear center differential 24. The center differential 24 of known design drives, as is known, the front wheels (not shown) of the primary axle 12 of the motor vehicle via side differentials 26, 28 and via drive shafts 12a, 12b.

With its half shafts 30, 32, the center differential 24, which is driven via the variable speed transmission 22, drives the coaxial side differentials 26, 28, wherein the input elements of the planetary transmissions are in each case the arm 26a, 28a, which carries the planetary gears.

The output elements of the planetary transmission 26, 28 are the sun gears 26b, 28b, which are coupled with the drive shafts 12a, 12b of the primary axle 12 and further the ring gears 26c, 28c, which are connected with the driving belt wheels 14a, 16a of the toothed-belt drive.

The toothed belts 14b, 16b drive the rear wheels of the motor vehicle via belt wheels 14c, 16c on the secondary axle 18 or via drive shafts 18a, 18b on both sides.

The toothed-belt drives 14, 16, the side differentials 26, 28 mounted to the drive aggregate 10 and the drive shafts 18a, 18b with the belt wheels 14c, 16c of the secondary axle 18 are rotatably supported or rotatably arranged in corresponding housings (not shown).

As a result of assigning the side differentials 26, 28 to the center differential 24, the center differential drives, via the half shafts 30, 32, the side differentials which then depending on the transmission layout divide the drive torque for example at a ratio of 50:50 or 60:40 to the drive shafts 12a, 12b or the front wheels and via the toothed-belt drives 14, 16 to the drive shafts 18a, 18b of the rear wheels of the motor vehicle.

Rotational speed differences between the primary axle 12 and the secondary axle 18 are thus compensated via the side differentials 26, 28 and rotational speed differences between the wheels of the motor vehicle on the same side are compensated via the center differential 24.

Depending on the mounting situation of the drive aggregate 10 (front or rear mounted), the primary axle 12 and the secondary axle 18 can be the front axle or the rear axle of the motor vehicle.

Figure 2:
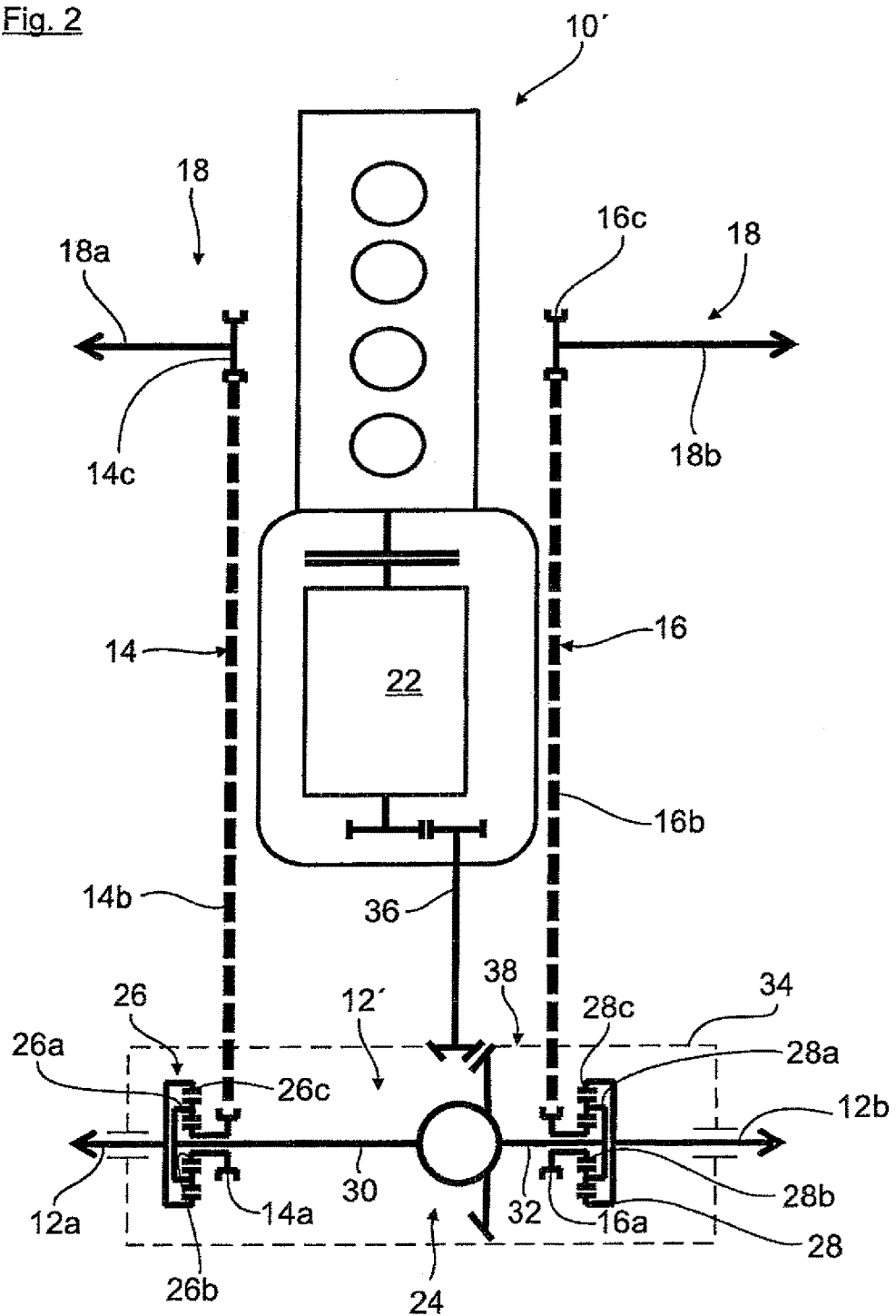
FIG. 2 a schematic diagram of a drive device, with longitudinally mounted drive device and a primary axle which includes the three differentials in an axle housing, which primary axle drives the front secondary axle via two lateral toothed-belt drives.
Figure 3:
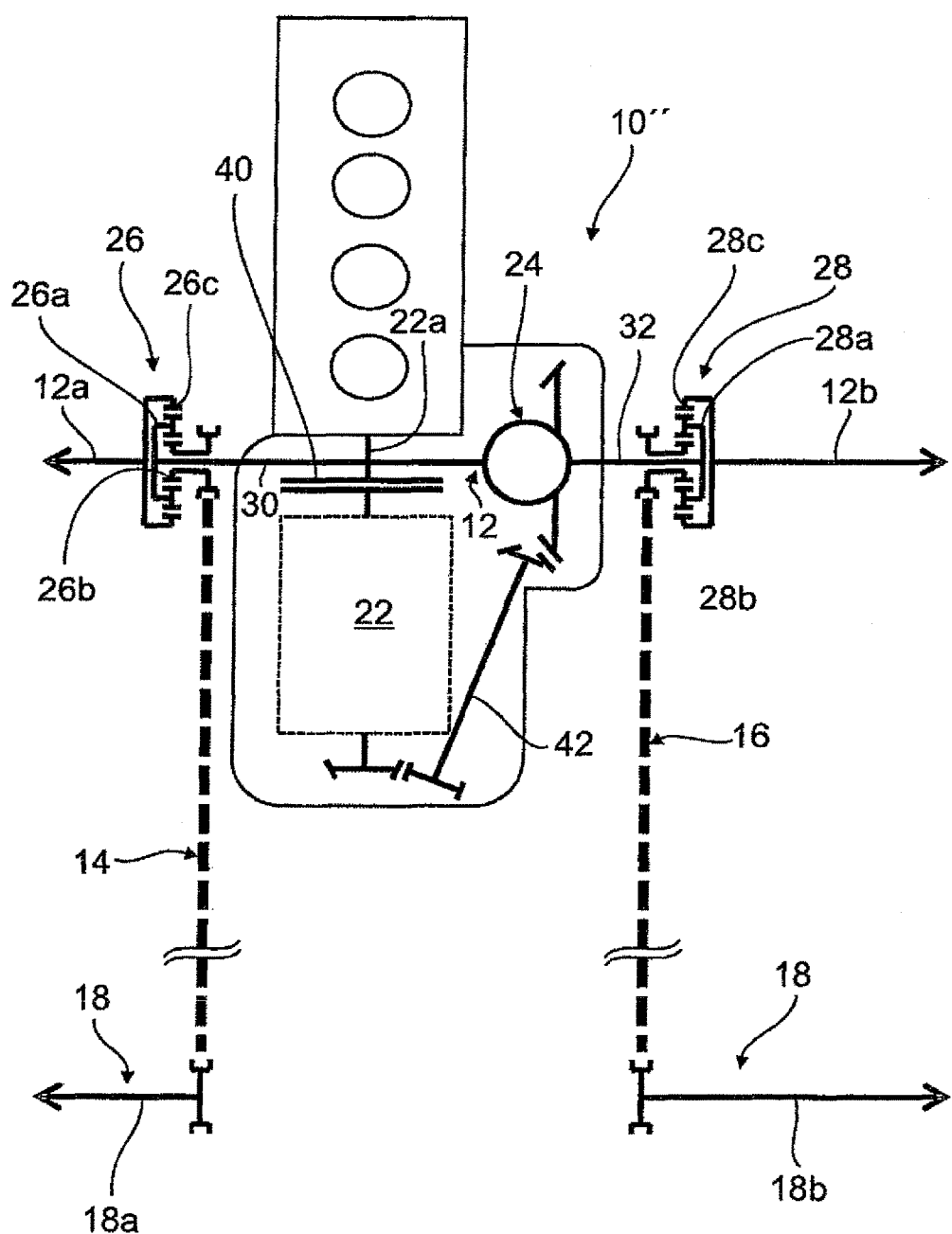
FIG. 3 a drive device with longitudinally mounted drive aggregate, to which the center differential is laterally mounted, which is coupled to the side differentials arranged on both sides of the drive aggregate via drive half-shafts.

FIGS. 2 and 3 show alternative drive devices, which are only described insofar as they significantly differ from FIG. 1. Functionally same parts are provided with the same reference numerals.

According to FIG. 2 the drive aggregate 10' is mounted longitudinally in the front of the motor vehicle.

The center differential 24 and the side differentials 26, 28 are arranged coaxial in a common axle housing 34 (indicated with dashed lines), which forms the primary axle 12', wherein the half shafts 30, 32 of the center differential 24 drive the side differentials 26, 28 as described above.

The variable speed transmission 22 of the drive aggregate 10' drives the differential ring gear of the center differential 24 via a drive shaft 36 by means of a bevel gear 38. The drive shaft 36 can for example be a cardanic shaft.

The side differentials 26, 28 drive the drive shafts 12a 12b of the primary axle 12 or the rear wheels of the motor vehicle via the sun ears 26b, 28b, while the ring gears 26c, 28c act on the secondary axle 18 or the front wheels of the motor vehicle via belt wheels 14a, 16a, the toothed belts 14b, 16b and the belt wheels 14c, 16c, or via the toothed-belt drives 14, 16 which are guided laterally frontward past the drive aggregate 10' and the drive shafts 18a, 18b.

FIG. 3 shows a further alternative drive device in which the drive aggregate of the motor vehicle, again mounted longitudinally in the front, has a center differential 24 of the primary axle 12, which center differential is mounted laterally in the region of the starting clutch 40, and which is driven in a manner known per se via a frontward guided output shaft 42 of the variable speed transmission 22.

The center differential 24 drives the right front wheel via the one half shaft 32 and the side differential 28 and drives the rear wheel of the motor vehicle via the toothed-belt drive 16, while the axially longer half shaft 30 drives the left side differential 26 while crossing the transmission input shaft 22a of the variable speed transmission 22, and the left side differential 26, as described above, drives the drive shaft 12a of the left front wheel of the motor vehicle and via the toothed-belt drive 14 the left rear wheel of the secondary axle 18.

As can be seen the right side differential 28 is directly mounted to the bevel-gear center differential 24, which is integrated in the transmission housing of the variable speed transmission 22, while the left side differential 26 and the corresponding toothed-belt drive 14 are guided rearward past the drive aggregate 10".

The invention is not limited to the described exemplary embodiments. In particular, each drive device of FIGS. 1 to 3 can be mounted at the front as well as at the rear of the motor vehicle, wherein the primary axle 12 (directly driven) can be the front axle or the rear axle; the same applies to the secondary axle 18, which is indirectly driven via the belt drive 14, 16.

The bevel-gear center differential 24 may also be constructed as a planetary transmission of known construction.

In addition, gear transmissions (not shown) can be provided on the belt wheels 14a, 16a, 14c, 16c, which cause a step down ratio on the driving belt wheel 14a, 16a (traction decrease) and a step up ratio on the outputting belt wheel 14c, 16c (increase of torque) or respectively adjust the rotational speed of the drive shafts 12a, 12b and 18a, 18b to correspond to each other.

What is claimed is:

1. A drive device for a four-wheel-drive motor vehicle, comprising:
   a drive aggregate transversely mounted in the four-wheel-drive motor vehicle relative to a longitudinal axis of the motor vehicle;
   a primary axle having a center differential, said center differential being integrated in a housing of the drive aggregate, said drive aggregate mounted on the primary axle;
   a secondary axle; and
   side differentials arranged coaxial to the center differential and attached axially adjacent to the housing of the drive aggregate, said side differentials having input elements and output elements, said input elements being drivingly connected to output elements of the center differential, said output elements of the side differentials being drivingly connected with drive shafts of the secondary axle, and with drive shafts of the secondary axle via separate belt drives.

2. Drive device according to claim 1, wherein the center differential is configured as bevel-gear differential and the side differentials are configured as planetary transmissions.

3. Drive device according to claim 2, wherein the input elements of the side differentials are formed by arms of the planetary transmission that carry planet gears, and the output elements of the side differentials are formed by sun gears and ring gears of the planetary transmission.

4. The drive device of claim 1 claims, wherein the belt drives are one-part or multi-part toothed belt drives.

\* \* \* \* \*